R. YIELDING.
Improvement in Crucibles for Melting Metals, etc.

No. 120,807.   Patented Nov. 7, 1871.

Witnesses:
A. Bennerkendorf
Francis McArdle

Inventor:
R. Yielding
PER Munn &
Attorneys.

AM. PHOTO-LITHOGRAPHIC CO. N.Y. (OSBORNE'S PROCESS.)

UNITED STATES PATENT OFFICE.

RICHARD YEILDING, OF DETROIT, MICHIGAN.

IMPROVEMENT IN CRUCIBLES FOR MELTING METALS, &c.

Specification forming part of Letters Patent No. 120,807, dated November 7, 1871.

*To all whom it may concern:*

Be it known that I, RICHARD YEILDING, of Detroit, in the county of Wayne and State of Michigan, have invented a new and useful Improvement in Crucibles; and I do hereby declare that the following is a full, clear, and exact description thereof, which will enable others skilled in the art to make and use the same, reference being had to the accompanying drawing forming part of this specification.

My invention relates to improvements in crucibles of black lead, or compositions thereof, with other substances.

Figure 1:
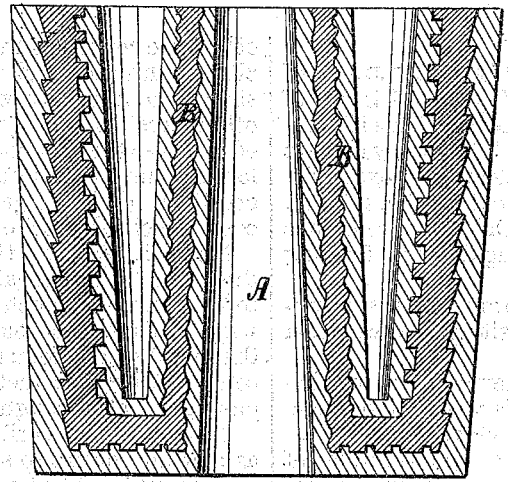
Figure 2:
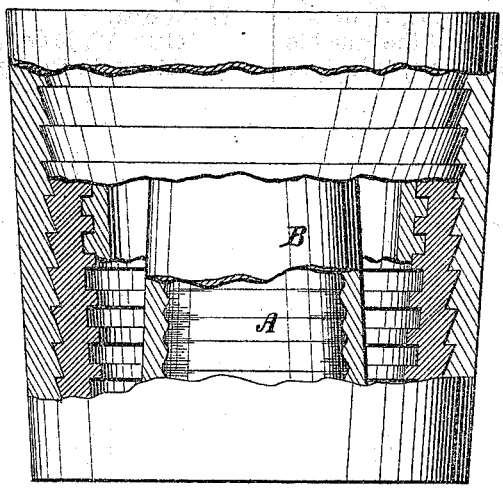

Figure 1 is a sectional elevation of my improved crucible, and Fig. 2 is partly a side elevation and partly a sectional elevation.

I propose to provide the ordinary crucibles of plumbago or other substance with a flue or passage, A, from the bottom to the top, as shown, for allowing the heat to act upon the center of the mass of metal contained in the crucible more directly than it otherwise can, the said passage to be surrounded by a shell or tube, B, of the same material that the other part of the crucible is made of. I also propose to groove, indent, or otherwise construct the sides or walls of the crucible both inside and out to form projections, as shown, to interlock with the paste or clay or other substance with which the crucible is coated to cause the said coatings to be retained much longer than they now are, thereby preserving the crucibles much longer, and thus cheapen the cost of melting steel or other metals.

I find in practice that by this improvement the crucibles are capable of being used from six to ten times as much as when in the ordinary way. I have also demonstrated practically that the metal can be reduced much quicker and with considerably less fuel in crucibles having the passage A up through the metal-holding space.

Having thus described my invention, I claim as new and desire to secure by Letters Patent—

A crucible ribbed and grooved to receive and lock the coating thereto, in the manner specified.

RICHARD YEILDING.

Witnesses:
GEO. W. MABEE,
ALEX. F. ROBERTS.

(115)